April 19, 1960  J. ROCKOFF  2,932,856
METHOD FOR MANUFACTURING ROLLER ASSEMBLIES
Filed March 12, 1957
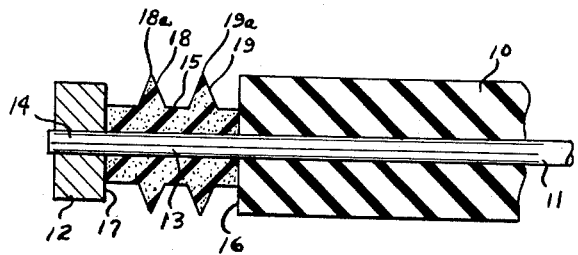
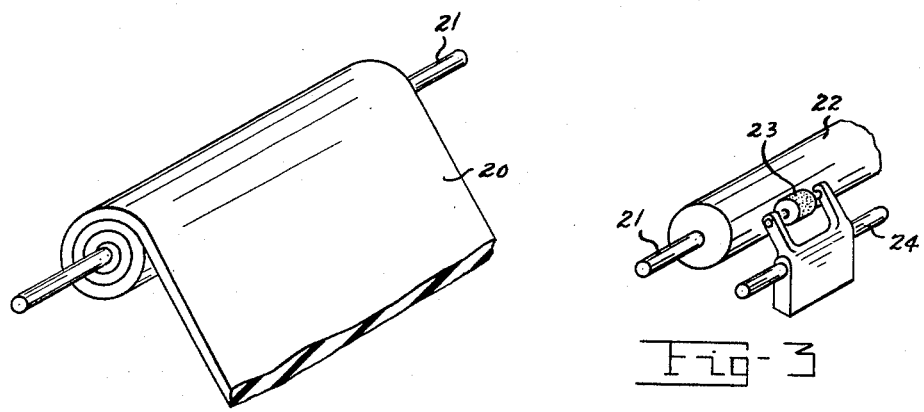
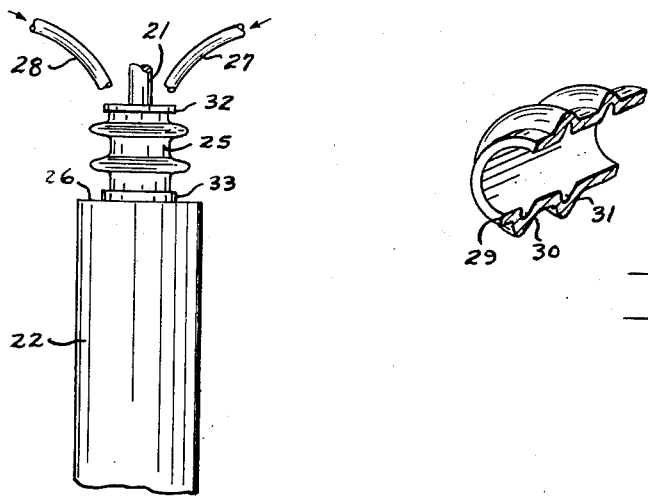
INVENTOR.
JOSEPH ROCKOFF
BY Reuben Wolk
ATTORNEY

United States Patent Office 2,932,856
Patented Apr. 19, 1960

2,932,856
METHOD FOR MANUFACTURING ROLLER ASSEMBLIES

Joseph Rockoff, Dayton, Ohio, assignor to The Dayton Rubber Company, Dayton, Ohio, a corporation of Ohio Application March 12, 1957, Serial No. 645,593

6 Claims. (Cl. 18—59)

The present invention relates to roller assemblies comprising a roller body and the rotatable mounting means therefor and to the method for manufacturing the same.

Roller assemblies according to the present invention are particularly designed for use in those applications wherein the roller bodies will be in contact with corrosive fluids such, for example, as are encountered in galvanizing or other sheet metal processing machinery and in other material handling or coating operations. In the galvanizing of sheet metal, rollers are required first to transmit the galvanizing or "pickling" acids to the metal sheet and second to convey the sheet coated thereby through the various baths and stages of the galvanizing process.

While in such instances, the roller body itself may be conveniently composed of a corrosion resistant material such as rubber or a similar plastic substance, it is usually necessary that the roller shaft, the bearings in which it operates and other parts of the machinery be of a metal or like material which is not corrosion resistant as compared to the material of the roller body proper. Since however, the corrosive liquid coming in contact with the roller body tends to move from the body on to the shaft and along the shaft to the bearings and other parts of the machinery in which the roller is mounted, means have been sought for protecting the corrodible portions of the roller assembly and the related machinery.

In the past, it has been the common practice to construct the roller body so that it extends over substantially the entire length of the shaft regardless of the otherwise desirable length relationship between these components. While this expedient has resulted in a protection of a greater portion of the shaft, it has not prevented the corrosive fluid from ultimately transmigrating to the shaft, its bearings and other corrodible components of the machinery. Furthermore, this additional length of the roller body beyond that actually required for it to perform its necessary functions has resulted in cumbersome rollers and an excessive use of roller body material.

As a more workable means of protecting the corrodible elements of the roller machinery from the corrosive fluid, the end portions of the roller body beyond the limits of its working length have been provided with radially extending annular protrusions or "flingers" which are in the form of discs spaced by circumferential grooves cut in the body itself. From the outer periphery of these protrusions, the fluid will be cast or "flung" from the roller before it can reach the corrodible elements of the machinery.

It has been the uniform practice in the prior art to form the roller body in the first instance of such a length that it covers the entire shaft between the points at which it is ultimately to be journaled in the corrodible bearings. The end portions of the body thus formed are then machined or cut away to leave only a relatively thin protective coating around those portions of the shaft extending beyond the working length of the roller body proper. Where the raised ribs or flingers are desired, the machining or cutting is controlled so that the material will not be cut away at the points such flingers are desired. The cutting and forming required in this procedure has been time consuming and has resulted in a considerable waste of material. Moreover, as is usually the case, where a relatively deformable substance has been employed in the roller body, it has been difficult, if not impossible, to cut or otherwise form such matrial so that the flingers will taper to a fine edge at their outer periphery as is preferred for the most efficient removal of the corrosive fluid before it works its way to the bearings.

It is accordingly an object of the present invention to provide an improved roller assembly and method for manufacturing the same.

It is a further object of the present invention to provide such as assembly wherein the extensions of the roller shaft beyond the roller body and the bearings in which such extensions are journaled, will be protected from corrosive liquids with which the roller body is in contact.

It is still another object of the present invention to provide a method for manufacturing such roller assemblies which will not require expensive and time consuming cutting or forming of the roller body material about the shaft extensions.

It is yet a further object of the present invention to provide such a method wherein the protective material surrounding the shaft extension may be conveniently and economically provided with radially extending ribs to cast the corrosive material away from the assembly before it reaches the corrodible bearings.

These and other objects and advantages of the present invention which will be apparent from a reading of the following disclosure, are achieved in the present invention by the provision of a protective element which is separately formed upon the shaft extension after the roller body has been completely formed about the medial portion of the shaft. Since the roller body may thus be finished independently of the protective means, no extra roller material is required beyond that which will actually make up the roller body proper. Once the body is thus formed, collar type molds defining a cavity conforming in shape to that of the ultimately desired shaft extension protective means are positioned about the shaft extensions and are filled with a suitable material which will be molded therein. The material forming the protective coating of the shaft extension must, of course, be of a non-corrodible material; but, since such coating is completely divorced from the roller body proper, it is no longer necessary or desirable that the material of these respective components should be identical. It has been found that protective material which may be simply poured into the mold and therein derive its finally desired shape, is most conveniently employed in the manufacture of this component. A particularly suitable material has been found to be an activated plastic such as a polyurethane modified by a diisocyanate which may be foamed or expended in situ. Such material, in addition to its corrosion resistance, is porous and therefore light in weight so that a suitable shaft extension coating may be provided with a minimum of material and addition of weight. Also such material may be controlled so that it will be substantially rigid thereby to accommodate flingers which taper to a fine edge from which the corrosive liquids may be cast most efficiently. The rigidity of the material about the shaft extension also provides improved support to the roller body and may be relied upon to provide lateral stability to the roller assembly where the rigid protective sleeve spans the distance between the end of the roller body and the bearing in which the shaft is supported, thereby providing a constantly acting spacer between the roller body and the bearing.

The invention thus generally described may be more clearly understood from the following detailed description in connection with reference which may be had to the appended drawings.

In the drawings:

Figure 1 is a fragmentary elevational view in cross section showing a roller assembly according to the present invention.

Figure 2 is a perspective view, partially broken away, showing a method of building a roller body upon a shaft according to the present invention.

Figure 3 is a fragmentary perspective view showing a method of finishing a roller body according to the present invention.

Figure 4 is a fragmentary elevational view illustrating a method for forming the shaft extension protective component of the roller body assembly according to the present invention.

Figure 5 is a perspective view of one piece of a two-part mold shell used in the formation of the shaft extension protective component according to the present invention.

Referring now to Figure 1, the present invention relates to a roller assembly comprising a roller body 10 upon a shaft 11 which is journaled at its ends in suitable bearings 12 by which it is rotatably supported. It will be noted that the roller body 10, which may be cylindrical as shown, terminates at a point on the shaft 11 which is separated from the bearing 12 so as to create a shaft extension 13 which extends beyond the body into the bearing 12. It is this shaft extension 13 which has previously been protected from the corrosive fluids on the roller body 10 by simply forming the body 10 in the first instance so that it covered the extension 13 and extended to a point on the shaft at or very near the portion 14 thereof journaled within the bearing 12.

The roller body may be designed to operate partially submerged in or otherwise in contact with a corrosive fluid and must therefore be made of a corrosion-resistant material. In material handling and processing machinery, it is usually desirable that the body be composed of a relatively deformable substance; and such materials as rubber, synthetic rubber and the various organic plastics; e.g., polyvinyl chloride, polyamide resins and the like are satisfactory. In most cases, such of these materials as may be classified as vulcanizable elastomeric substances; i.e., rubber and the various synthetic rubbers, are employed. Because of the loads to which the roller assembly will be subjected in operation, the shaft 11 and the bearings 12 are normally made of a strong, substantially rigid metal which is not resistant to the corrosive effects of the liquid in contact with the roller body.

Since however, the corrosive fluid will come into contact with the shaft extension 13 and the bearings 12, measures must be taken to protect them. The protective component according to the present invention illustrated in Figure 1, comprises a roller body extension member or shaft extension protective sleeve which surrounds and is mounted upon the shaft 11 at its extension 13 and at least substantially spans the difference between the end 16 of the roller body 10 and the opposing face 17 of the bearing such as 12 at the same end of the assembly.

This body extension member 15 is composed of a material which is resistant to the corrosive effects of any fluid that might come in contact with it and is preferably relatively rigid as compared to the relatively more deformable materials commonly employed in the manufacture of the roller body 10. Such substantial rigidity allows the protective sleeve 15 to act as a stop or control upon the lateral movement or vibration of the roller body 10 and as an end support for such body. This rigidity also allows for the more precise formation of the radially extending annular protrusions or flingers 18 and 19 which, because their outer circumference is greater than the outer circumference of the remainder of the plastic extension 15 and because the peripheral speed of the extension member is thus greater at such outer circumference, will cause any of the corrosive fluid moving from the roller toward the bearing to move toward the outer periphery of the flingers 18 and 19 and to be cast therefrom. It has been found that this function of the flingers is most efficiently achieved if they taper outwardly to a ridge as at 18a and 19a, and such a tapering can be more readily accomplished where the material is substantially rigid.

One particularly desirable material for the sleeve 15 has been found to be the foamed or expanded cellular plastic material referred to generally as polyurethane foam. This material is formed by the controlled mixture of the prepolymer such as one of the urethane plastics and a modifier or activator such as a diisocyanate. One of the additional advantages derived from the use of this material is the fact that the basic ingredients therefore may be introduced into a mold at the ultimately desired position of the sleeve 15 about the shaft 11 whereupon the material will expand in situ to fill the mold while simultaneously becoming securely bonded or adhered to the shaft extension 13 and, if desired, to the end 16 of the roller body 10.

In the manufacture of roller assemblies according to the present invention, the roller body proper such as 10 of Figure 1, may be built by continuously winding a sheet or slab 20 of rubber or similar elastomeric material about a shaft such as 21 of Figure 2, which may be supported and rotatably driven so as to accommodate the continuous winding of the slab 20. In lieu of thus laminating the roller body, a slab of a thickness corresponding substantially to that desired in the finished roller body may be wrapped only once around the shaft and suitably spliced. Similarly, the roller body may be formed by successively winding separate layers of the elastomeric material, each of which layers completes only one turn about the shaft. Regardless of the particular manner chosen for applying the elastomeric material to the shaft, it is usually preferred that a suitable rubber-to-metal adhesive be first applied to the shaft at those areas subsequently to be contacted by the elastomeric material thereby to achieve a firm bonding between the body and the shaft during the finishing process which normally includes vulacnization under heat and/or pressure. The width of the sheet 20, according to the present invention, need be no wider than the ultimately desired length of the roller body since none of the body material will have to be employed in the formation of the body extension member such as 15 of Figure 1.

Once the body has been built up, it may be subjected to such conditions of heat and/or pressure as will result in its becoming substantially permanently set. Where the body is composed of rubber, synthetic rubber or other vulcanizable materials, such finishing is accomplished by vulcanization which may be carried out in hot air, hot water, or steam ovens. If the heating medium surrounding the roller can be pressurized, no additional pressure is required, but where only substantially atmospheric conditions prevail within the oven, vulcanization pressure may be obtained by conventional means such as compacting the roller body by rag wrapping.

Where the uniformity and alignment of the roller body surface is important in its ultimate use, the vulcanized body may be subjected to additional operations such as shown in Figure 3, wherein the roller body 22 upon the shaft 21 is ground by a suitable abrasive device such as the grinding wheel 23 mounted for transverse motion axially of the body 22 upon a control or guide shaft 24 which is fixed in permanent alignment with the shaft 21 of the roller assembly.

From the method of manufacture thus far explained, it can be seen that the roller body proper may, if desired, be completed even through the finishing stages of surface grinding before any attention is given to the protection of the extension of the shaft 21 beyond the body. It will also be observed that considerable savings in materials has been effected because such material as would normally be employed to cover the shaft extension is no longer required. Rollers consisting of the roller body and the shaft manufactured as described above, may be stored until their ultimate use is finally determined at which time the body extension member such as 15 of Figure 1 may be applied according to the shape and composition thereof as determined by such final use.

Once the roller body 22 has been completely finished upon the shaft 21 as above described or at any time thereafter when the shape and composition of the body extensions may be determined, such body extensions may be conveniently formed as illustrated in Figures 4 and 5. In Figure 4, the roller body 22 having been finally vulcanized and ground, is placed in a vertical position with the extension of the shaft 21 projecting from the upper end thereof. About this projecting portion of the shaft 21 may be positioned a suitable hollow, annular mold shell 25 open at each of its ends. Where, as is usually the case, it is desired that the body extension to be formed at this mold cavity member 25 should be in contact with and even adhered to the end 26 of the roller body, the mold member 25 may rest upon the end 26 of the roller body. With the mold member 25 so positioned and thus resting against the end of the roller body, the plastic material may be poured into the cavity at that end of the mold member 25 opposite the end which rests against the end 26 of the roller body. Where a polyurethane plastic is to be employed in conjunction with a diisocyanate modifier, the ingredients may be simultaneously added for example through the conduits 27 and 28 respectively, which may be controlled to empty into the mold cavity. It is to be understood that the polyurethane or the prepolymer will be introduced via the conduit 27 whereas the diisocyanate modifier may be introduced to the mold cavity through the tube 28. The ingredients thus introduced into the cavity will foam and expand therein to fill the cavity while at the same time becoming adhered to the shaft extension and/or to the end 26 of the body 22. Although the body extension may thus be substantially integrated with the body it is still to be regarded as separate from the body in that it is separately formed and has no direct association with the body other than as a result of such bonding thereto as may be achieved during or after its separate formation.

Where the lateral protusions or flingers are desired, the same may be provided in the same manner as that above described except that provision will have to be made in the contour of the mold cavity for such protrusions. The annular open-ended mold member may consist, in such cases, of two mated halves, one of which is designated by the number 29. The shape of the interior of these halves will include the circumferentially aligned depressions such as 30 and 31 conforming to the ultimately desired external shape of the flingers. Mated halves similar to that shown at 29 in Figure 5 may be joined to form a complete shell capable of surrounding the shaft extension, and these halves may be held together during the introduction of the plastic material and the molding thereof by suitable circumferential clamps such as those shown at 32 and 33 in Figure 4. Once the body extension has been completed, the clamps may be removed and the halves separated.

It can be appreciated that roller body extensions of many shapes and variations may be added according to the present invention separate and apart from the complete formation of the roller body proper to protect the extensions of the roller shaft without departing from the spirit of the present invention. It will also be appreciated that the protective sleeves such as 15 in Figure 1 may be of such a length that they will completely span the distance between the bearings in which the shaft is to be journaled and the ends of the roller body.

While the present invention has been described in considerable detail in connection with certain preferred embodiments referred to above, it is to be understood that all such detail and particularization have been for purposes of description and illustration only and are in no way intended to limit the scope of the invention as it is more particularly defined in the subjoined claims.

I claim:

1. A method for the manufacture of roller assemblies comprising laminating successive layers of elastomeric material about a shaft, the layers being of a width less than the length of said shaft thereby leaving shaft extensions beyond the ends of the laminated body, completely forming said body and thereafter separately forming a protective sleeve about at least one of said extensions.

2. A method for the manufacture of roller assemblies comprising building and completely finishing a roller body about the medial portion of a shaft to leave shaft extensions beyond the ends of said body, placing a hollow, annular mold shell about at least one of said shaft extensions to define an annular space therearound, filling said space with a corrosion-resistant plastic material, allowing said plastic material to become set and thereafter removing said shell.

3. A method for the manufacture of roller assemblies comprising building and completely finishing a roller body about the medial portion of a shaft to leave shaft extensions beyond the ends of said body, placing a hollow, annular mold shell about at least one of said shaft extensions to define an annular space therearound, filling said space with a mixture of a polyurethane resin and a diisocyanate and allowing the mixture to expand in situ to assume the shape of said space.

4. A method for the manufacture of roller assemblies comprising building and completely forming a roller body about the medial portion of a shaft to leave shaft extensions beyond the ends of said body, clamping mated mold shells together to form a hollow, open-ended collar about at least one of said extensions to define therewith an annular cavity therearound, molding a corrosion-resistant sleeve within said cavity and thereafter removing the clamps and the mated mold shells.

5. A method for the manufacture of roller assemblies comprising building and completely forming a roller body about the medial portion of a shaft to leave a shaft extension beyond at least one end of said body, placing an open-ended, hollow mold collar about said extension and said body an annular cavity surrounding said extension adjacent the end of said body, molding a corrosion-resistant sleeve within said cavity and removing the mold collar therefrom.

6. A method for the manufacture of rollar assemblies comprising building and completely forming a roller body about the medial portion of a shaft to leave a shaft extension beyond at least one end of said body, placing an open-ended, hollow mold shell about said extension and against the end of said body to define with said extension and said body an annular cavity surrounding said extension adjacent the end of said body, pouring a mixture of a polyurethane resin and a diisocyanate into said cavity, allowing the mixture to expand and to become permanently set therein and thereafter removing the mold shell.

References Cited in the file of this patent

UNITED STATES PATENTS

| | | |
|---|---|---|
| 305,895 | Conwell | Sept. 30, 1884 |
| 444,206 | Bingham | Jan. 6, 1891 |
| 1,741,211 | Vallier | Dec. 31, 1929 |
| 2,517,746 | Whelton et al. | Aug. 8, 1950 |
| 2,638,073 | Carter | May 12, 1953 |
| 2,753,642 | Sullivan | July 10, 1956 |